US011003696B2

(12) United States Patent
Hu et al.

(10) Patent No.: US 11,003,696 B2
(45) Date of Patent: May 11, 2021

(54) ADAPTIVE GEOGRAPHICAL DATA CACHING BASED ON A ROUTE PATTERN

(71) Applicant: Uber Technologies, Inc., San Francisco, CA (US)

(72) Inventors: Norbert Y. Hu, San Francisco, CA (US); Calvin Shawn Lien, Pleasanton, CA (US); Brian Patrick Donovan, Oakland, CA (US); Brent Evans Hamby, Oakland, CA (US)

(73) Assignee: Uber Technologies, Inc., San Francisco, CA (US)

(*) Notice: Subject to any disclaimer, the term of this patent is extended or adjusted under 35 U.S.C. 154(b) by 356 days.

(21) Appl. No.: 16/023,594

(22) Filed: Jun. 29, 2018

(65) Prior Publication Data

US 2020/0004844 A1    Jan. 2, 2020

(51) Int. Cl.
| | |
|---|---|
| *G01C 21/30* | (2006.01) |
| *G06F 16/29* | (2019.01) |
| *G08G 1/0968* | (2006.01) |
| *H04W 4/40* | (2018.01) |
| *H04L 29/08* | (2006.01) |

(52) U.S. Cl.
CPC ........... *G06F 16/29* (2019.01); *G08G 1/0968* (2013.01); *H04L 67/1021* (2013.01); *H04L 67/1097* (2013.01); *H04W 4/40* (2018.02)

(58) Field of Classification Search
CPC ....... G06F 16/29; G08G 1/0968; H04W 4/40; H04W 4/024; H04W 4/029; H04L 67/1021; H04L 67/1097; H04L 67/2842; G01C 21/30

USPC ................. 701/400, 462; 726/22; 340/932.2; 345/522, 600
See application file for complete search history.

(56) References Cited

U.S. PATENT DOCUMENTS

| | | | |
|---|---|---|---|
| 10,078,337 B1* | 9/2018 | Yao ..................... | G01C 21/3492 |
| 2011/0283355 A1* | 11/2011 | Livshits ................ | G06F 16/958 |
| | | | 726/22 |
| 2013/0147820 A1* | 6/2013 | Kalai ....................... | G06F 16/29 |
| | | | 345/522 |
| 2013/0147846 A1* | 6/2013 | Kalai ...................... | G01C 21/34 |
| | | | 345/660 |
| 2015/0134850 A1* | 5/2015 | Rolf ....................... | H04L 45/126 |
| | | | 709/241 |
| 2017/0016730 A1* | 1/2017 | Gawrilow .............. | G01C 21/30 |

(Continued)

*Primary Examiner* — Shardul D Patel
(74) *Attorney, Agent, or Firm* — Schwegman Lundberg & Woessner, P.A.

(57) ABSTRACT

Various embodiments partition map data into discrete portions of map data based on predetermined boundaries, and individual map data portions (e.g., shards) are assigned to individual computing nodes in a plurality of computing nodes that service geographic routing requests. A routing component associated with the plurality of computing nodes directs the geographic routing request to one or more computing nodes. The computing nodes adaptively cache geographical map data based on, for example, data relating to past geographic routes. Once cached at a computing node in a plurality of computing nodes, the computing node services current and future geographic routing requests using its assigned portion of map data and one or more portions of map data adaptively cached at the computing node, thereby reducing chances of more than one computing node getting involved in servicing a request.

20 Claims, 6 Drawing Sheets

(56) References Cited

U.S. PATENT DOCUMENTS

| | | | |
|---|---|---|---|
| 2017/0082453 A1* | 3/2017 | Fischer | G01C 21/3626 |
| 2018/0053415 A1* | 2/2018 | Krunic | G08G 1/0145 |
| 2019/0057481 A1* | 2/2019 | Zhang | G06Q 10/06315 |
| 2019/0078901 A1* | 3/2019 | Jalasutram | G01C 21/343 |

* cited by examiner

ADAPTIVE GEOGRAPHICAL DATA CACHING BASED ON A ROUTE PATTERN

TECHNICAL FIELD

The described embodiments generally relate to map data and, more particularly, to systems, methods, and machines for adaptively caching geographical data on a computing node based on a geographic route pattern.

BACKGROUND

Sharding can be used by geographic routing services to make large map data sets more useable and manageable and to overcome memory/data storage constraints of individual computing nodes. For example, using sharding, a large map dataset is broken up (e.g., horizontally partitioned) into several smaller data portions (or data shards) of the large map dataset, where each data shard does not generally overlap with any other data shard. Generally, the map data shards are distributed to individual computing nodes that collectively service one or more geographic routing requests (from a transportation or delivery service arrangement application on a client device). By distributing the resulting shards to individual computing nodes, geographic routing requests can be directed to one or more individual computing nodes based on the relevancy between the requested geographic route and the map data shards assigned to and used by the one or more individual computing nodes. This can improve response times for geographic routing requests (e.g., improve over a single computing device that loads and uses the entire map dataset) and may also provide load balancing of geographic routing requests.

BRIEF DESCRIPTION OF THE DRAWINGS

Various ones of the appended drawings merely illustrate various embodiments of the present disclosure and cannot be considered as limiting its scope.

Figure 1:
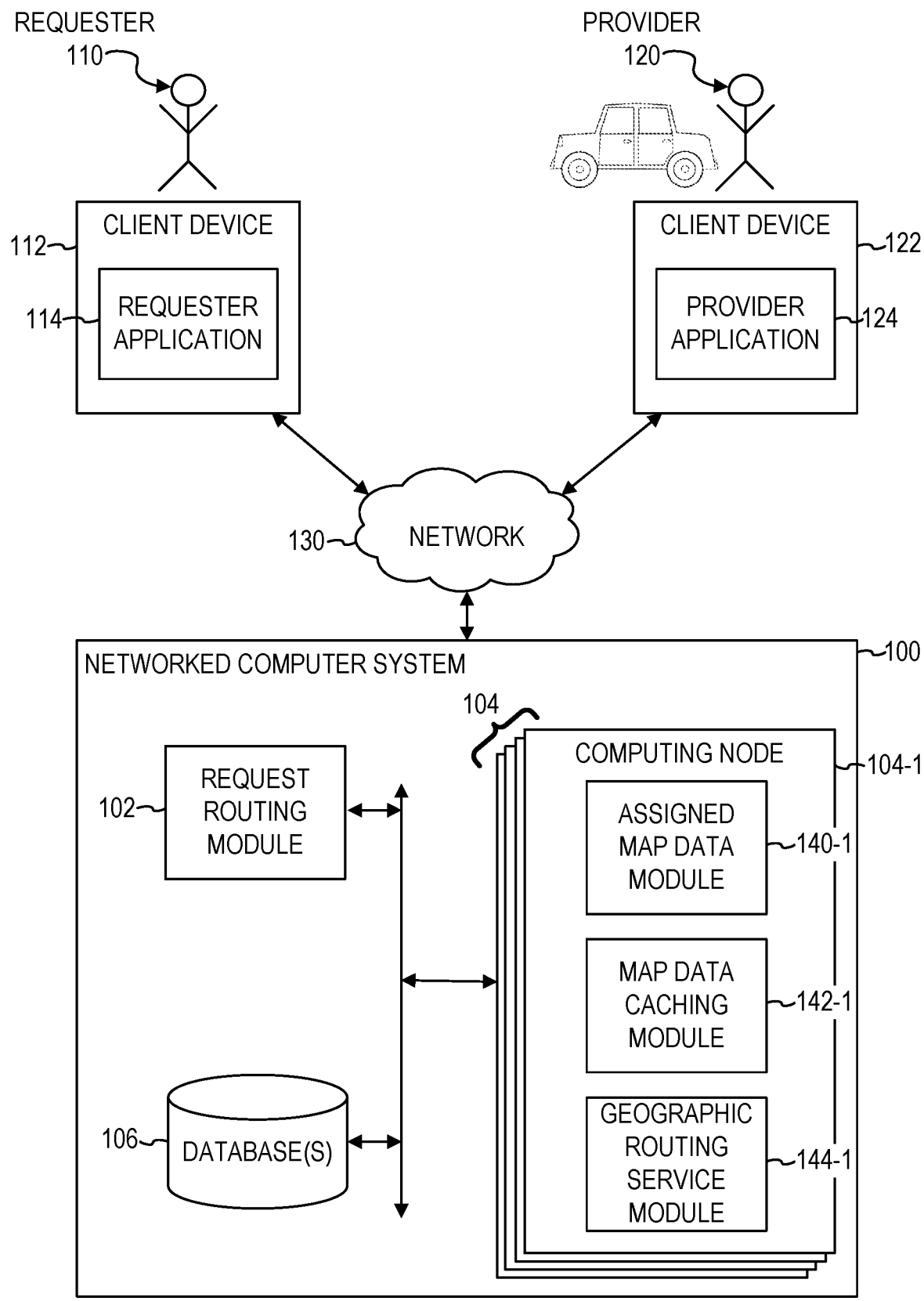
FIG. 1 is a block diagram of a system environment for a networked computer system, in accordance with some embodiments.

The headings provided herein are merely for convenience and do not necessarily affect the scope or meaning of the terms used.

DETAILED DESCRIPTION

The description that follows describes systems, methods, techniques, instruction sequences, and computing machine program products for adaptively caching geographical data on a computing node based on various factors, such as past geographic routes on a geographic map (hereafter, "map").

As used herein, a geographic route is a route between at least two points on a geographic map. A geographic route may comprise several route segments, each of which may include a different pathway, such as a sidewalk, a road, a highway, a street, and the like. The geographic route generated by an embodiment described herein may include instructions for each route segment of the geographic route. Also, as used herein, a computing node includes any computing device, such as a server, desktop, mobile device, and the like.

According to various embodiments, map data is partitioned into discrete portions of map data (e.g., map data shards) based on predetermined boundaries (e.g., sharding boundaries), and individual map data shards are assigned to individual computing nodes in a plurality of computing nodes that service geographic routing requests. For example, a large set of map data are partitioned (e.g., sharded) across multiple computing nodes, in accordance with memory/data storage constraints of each computing node, while reserving memory/data store for caching map data as described herein. As used herein, a geographic routing request includes information describing at least one origin location and at least one destination location. A routing component associated with the plurality of computing nodes receives a geographic routing request (on behalf of the plurality of computing nodes) and directs the geographic routing request to one or more computing nodes based on the map data portions assigned to the one or more computing nodes and the relevance of those map data portions to the geographic routing request. As such, a given geographic routing request may be routed to (e.g., may hit) multiple computing nodes (rather than just one computing node) having different assigned portions of map data (e.g., different assigned map data shards) to service the given geographic routing request. In turn, the involvement of multiple computing nodes in servicing the given geographic routing request can increase the latency of the plurality of computing nodes responding to the given geographic routing request (e.g., responding with a requested route). However, various embodiments described herein can reduce such latency by reducing the chances of a given geographic routing request being directed (e.g., hitting) more than one computing node in the plurality of computing nodes that service geographic routing requests.

In particular, various embodiments described herein adaptively cache geographical map data (e.g., shingling map data entries) based on, for example, data relating to past geographic routes, such as past geographic routing requests, past geographic routing patterns, and the like. Once cached at a computing node in a plurality of computing nodes, cached portions of map data (e.g., shingled map data entries) may be evicted from the cache (e.g., according to a traditional caching strategy), whereas an assigned portion of map data (e.g., assigned map data shard) at the computing node is regarded as non-evictable map data and retained for use during servicing operations. The portion of map data (e.g., map data shard) assigned to the computing node may include core map data entries and, as noted herein, a geographic routing request may be initially directed to the computing node (e.g., by a routing component of the plurality) based on relevance of the assigned portion of map data (of the computing node) in responding to the geographic routing request.

According to various embodiments, a computing node in a plurality of computing nodes services current and future geographic routing requests using its assigned portion of map data and one or more portions of map data adaptively cached at the computing node. By attempting to service geographic routing requests using its assigned portion of map data and cached portions of map data before involving one or more other computing nodes (in the plurality of computing nodes) having different assigned portions of map data (e.g., different assigned map data shards), various embodiments can reduce the chances that a given geographic routing request needs to be directed to (e.g., hits) more than one computing node in the plurality of computing nodes in order to be serviced. Accordingly, through caching of map data, various embodiments achieve map data locality at individual computing nodes and avoid directing geographic routing requests to multiple computing nodes having different assigned portions of map data (e.g., different assigned map data shards), which in turn reduces (if not eliminates) the latency of the plurality of computing nodes in responding to the given geographic routing request.

Depending on the embodiment, the one or more portions of map data cached at a computing node (having an assigned portion of map data) may comprise: when a given geographic routing request involves routes that fall outside an assigned portion of map data, caching portion(s) of map data (e.g., map data shard(s)) in which the route lands and a minimum number of surrounding portions (e.g., surrounding map data shards); requesting additional map data from a read-through cache and, if there is a cache miss, accessing (e.g., retrieving) the additional map data, providing the additional map data (to the current request), and storing the additional map data in the cache for future requests; based on the assigned portion of map data (e.g., assigned map data shard), storing a predetermined set of map data portions (e.g., certain set of map data shards) in the cache; based on origin location associated with a current geographic routing request, storing a predetermined set of map data portions (e.g., certain set of map data shards) in the cache; based on history of routes generated to or from the current assigned portion of map data (e.g., the current map data shard), pre-storing map data portions associated with those routes in the cache; or relative to an origin location or destination location associated with a current geographic routing request, storing one or more portions of map data falling within a geometric boundary (e.g., circle, ellipse, square, triangle, rectangle) positioned relative to the origin/destination location (e.g., centered about the origin/destination location) in the cache.

Use of some embodiments obviates the need to manually draw geographic boundaries for partitioning map data (e.g., into map data shards). Additionally, some embodiments operate better than predetermining shingling, which pulls in map data neighboring an assigned portion of map data (e.g., an assigned map data shard) but still does not account for outlier geographic map requests that fall outside the assigned and shingled portions of map data and leads to the involvement of multiple computing nodes to service the outlier geographic map requests.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram of a system environment for networked computer system 100, in accordance with some embodiments. In some embodiments, the networked computer system 100 services geographic routing requests from client devices and servers, such as client devices 112 and 122. Depending on the embodiment, the client devices 112 and 122 submits geographic routing requests to the networked computer system 100 in connection with coordinating transportation of persons or goods/items for a service requester 110 (e.g., a rider) by a service provider 120 (e.g., a driver of a vehicle). The provider 120 may use a vehicle to provide the transportation to the requester 110.

In some embodiments, the networked computer system 100 comprises any combination of one or more of a request routing module 102, multiple computing nodes 104, and one or more databases 106. These modules and databases are not native components of a generic computer system, and provide structures and functions beyond generic functions of a computer system, as further described below.

Depending on the embodiment, each of the computing nodes 104 comprises an individual physical machine or an individual virtual machine (e.g., implemented using cloud-based resources). For some embodiments, each of the computing nodes 104 includes its own instance of an assigned map data module 140, a map data caching module 142, and a geographic routing service module 144. For illustrative purposes, the description below describes a single computing node 104-1 with respect to its own assigned map data module 140-1, map data caching module 142-1, and geographic routing service module 144-1.

According to various embodiments, the computing nodes 104 represent a plurality of computing nodes that collectively service a given geographic routing request by having the given geographic routing request directed (e.g., via the request routing module 102) to one or more of the computing nodes 104 as described herein.

A network 130 is any network that enables communication between or among machines, databases, and devices. For example, the network 130 communicatively couples the client devices 112 and 122 and the networked computer system 100 to facilitate communication therebetween. Accordingly, the network 130 may be a wired network, a wireless network (e.g., a mobile or cellular network), or any suitable combination thereof. The network 130 may include one or more portions that constitute a private network, a public network (e.g., the Internet), or any suitable combination thereof. Accordingly, the network 130 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or a WiMax network), or any suitable combination thereof. Any one or more portions of the network 130 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

In some embodiments, the modules 102, the computing nodes 104, and the database(s) 106 reside on a machine having a memory and at least one processor (not shown). In some embodiments, the modules 102, the computing nodes 104, and the database(s) 106 reside on the same machine, while in other embodiments, one or more of the modules 102, the computing nodes 104, and the database(s) 106 reside on separate remote machines that communicate with each other via a network (e.g., the network 130). It is contemplated that other configurations are also within the scope of the present disclosure.

In some embodiments, the requester 110 operates the client device 112 that executes a requester application 114 that communicates with the networked computer system 100. The requester 110 operates the requester application 114 to view information about the networked computer system 100, and to make a request for service from the networked computer system 100 for a delivery or transport service ("a transport service") of the requester 110 (and, optionally, additional persons) or items (e.g., cargo) needing transport. The requester application 114 determines a pick-up location within an origin location or enables the requester 110 to specify a pick-up location and a destination location associated with the requested service. The origin location or the destination location is a location inputted by the requester 110 or may correspond to the current location of the requester client device 112 as determined automatically by a location determination module (not shown) in the requester client device 112, such as a global positioning system (GPS) component, a wireless networking system, or a combination thereof. For purposes of simplicity, as described herein, the origin location includes a pick-up location for service (i) determined by the requester application 114 (e.g., based on the current location of the requester client device 112 using a GPS component), (ii) specified or selected by the requester 110, or (iii) determined by the networked computer system 100. In some embodiments, the networked computer system 100 recommends the pick-up location to the requester 110 based on historical service data (e.g., historical data describing past transportation or delivery service) associated with the origin location.

According to examples herein, the requester client device 112 transmits a set of data to the networked computer system 100 over a network 130 in response to the requester 110 input or operation of the requester application 114. Such data can be indicative of the requester 110's interest in potentially requesting service (e.g., before actually confirming or requesting the service). For example, the requester 110 launches the requester application 114 and specifies the origin location (e.g., pick-up location) and/or a destination location (e.g., drop-off location) to view information from the networked computer system 100 before deciding whether to request service. The set of data can include, or cause the generation of, one or more geographic routing requests at the networked computer system 100, which one or more of the computing nodes 104 service and respond to with one or more possible geographic routes between the origin location and the destination location involved in the service being potentially requested by the requester 110 via the requester application 114. For example, the geographic routing requests processed by the computing nodes 104 for the service being potentially requested may include, without limitation, a geographic route between the pick-up location (e.g., origin location) and a current location of the provider 120 or the client device 122, and a geographic route between the pick-up location (e.g., original location) and the drop-off location (e.g., destination location). Based on the geographic route(s) provided by the computing nodes 104, one or more average estimated time of arrivals (ETAs) can be determined for the service being potentially requested by the requester 110.

The requester 110 may want to view information about the one or more possible geographic routes generated via the computing nodes 104, average or estimated time of arrival for pick up by the provider 120, an estimated time to the destination, a corresponding cost, available service types, and the like. In some embodiments, the data includes the origin or destination location information, requester information (e.g., identifier), application information (e.g., version number), device identifier or type, and so forth. According to some embodiments, each time the requester 110 modifies the origin or destination location, the requester application 114 generates and transmits the data to the networked computer system 100.

Once the requester 110 confirms or orders a service via the requester application 114, the requester application 114 generates data corresponding to a request for the service through the networked computer system 100 (e.g., also referred to herein as a "service request"). In response to receiving the service request, the networked computer system 100 determines an average estimated time of arrival (ETA) at the pick-up location of providers 120 whose current location are within a threshold distance of the pick-up location (e.g., providers 120 who are all within one mile of the pickup location). In some embodiments, the networked computer system 100 uses information from the service request to match the requester 110 with an available provider 120. Depending on implementation, the service request includes requester 110 or device information (e.g., a requester identifier, a device identifier), a service type (e.g., vehicle type), selected service option (such as described herein), an origin location, a destination location, a payment profile identifier, a desired departure time, or other data. The networked computer system 100 selects the provider 120 from a set of providers, such as based on the provider's current location and status (e.g., offline, online, available) or information from the service request (e.g., service type, origin location, or destination location), to provide the service for the requester 110 and transport the requester 110 (or an item) from the origin location to the destination location. In response to selecting an available provider 120, the networked computer system 100 sends an invitation message to the provider client device 122 inviting the provider 120 to fulfill the service request.

The provider 120 operates the client device 122 executing a provider application 124 that communicates with the networked computer system 100 to provide information indicating whether the provider 120 is available or unavailable to provide transportation services to requesters 110. The provider application 124 also presents information about the networked computer system 100 to the provider 120, such as invitations to provide service, navigation instructions, map data, and the like. In one embodiment, the provider application 124 enables the provider 120 to provide information regarding availability of the provider 120 by logging into the networked computer system 100 and activating a setting indicating that the provider 120 is currently available to provide service. The provider application 124 also provides the current location of the provider 120 or the provider client device 122 to the networked computer system 100. In some embodiments, the current location is a location inputted by the provider 120 or may correspond to the current location of the provider client device 122 as determined automatically by a location determination module (not shown) in the provider client device 122 (e.g., a GPS component, a wireless networking system, or a combination thereof). The provider application 124 further allows the provider 120 to receive, from the networked computer system 100, an invitation message to provide a service for the requester 110, and if the provider 120 accepts, the provider application 124 transmits an acceptance message to the networked computer system 100. The networked computer system 100 subsequently provides information about the provider 120 to the requester application 114. In another embodiment, the provider application 124 enables the provider 120 to view a list of current service requests and to select a particular service request to fulfill.

The provider application 124 also receives geographic routing information, from the networked computer system 100, generated by one or more of the computing nodes 104 in response to one or more geographic routing requests generated in association with the service requested by the requester 110. For example, as noted herein, a geographic routing request may be submitted to one or more of the computing nodes 104 for a geographic route between the provider 120's current location (e.g., the provider client device 122's current location or one specified by the provider 120) and the requester 110's pick-up location (e.g., the requester client device 112's current location or one specified by the requester 110).

In some embodiments, the requester client device 112 and provider client device 122 are portable electronic devices such as smartphones, tablet devices, wearable computing devices (e.g., smartwatches), or similar devices. Alternatively, the provider client device 122 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities. The requester client device 112 and the provider client device 122 interact with the networked computer system 100 through client applications configured to interact with the networked computer system 100. The applications 114 and 124 of the requester client device 112 and the provider client device 122, respectively, present information received from the networked computer system 100 on a user interface, such as a map of the geographic region, and the current location of the requester client device 112 or the provider client device 122. The applications 114 and 124 running on the requester client device 112 and the provider client device 122, respectively, can determine the current location of the respective device and provide the current location to the networked computer system 100.

The networked computer system 100 may be configured to provide a communicative interface between the requester application 114, the provider application 124, and the various modules, nodes, and databases in the networked computer system 100. The networked computer system 100 is configured to receive provider availability status information and current location information from the provider application 124 and update the database(s) 106 with the availability status. The networked computer system 100 may also be configured to receive service requests from the requester application 114 and create corresponding service records in the database(s) 106. According to an embodiment, a service record corresponding to a service request includes or is associated with a service identifier (ID), a requester ID, an origin location, a destination location, a service type, pricing information, or a status indicating that the corresponding service request has not been processed. According to one embodiment, when the provider 120 accepts the invitation message to service the service request for the requester 110, the service record is updated with the provider's information as well as the provider's location and the time when the service request was accepted. Similarly, location and time information about the service as well as the cost for the service can be associated with the service record.

For some embodiments, the one or more service records can be used to generate a history of past geographic routes, or to determine geographic route patterns, associated with a portion of map data (e.g., map data shard) assigned to one of the computing nodes 104 (e.g., the computing node 104-1). According to some embodiments, at least one of the history of geographic routes or the geographic route patterns is used to determine what additional map data, different from the assigned portion of map data (e.g., assigned map data shard), is stored in a cache of one of the computing nodes (e.g., the computing node 104-1).

In one embodiment, during a transportation service, the networked computer system 100 receives information (e.g., periodically) from the provider application 124 indicating the location of the provider's vehicle or telematics information (e.g., indications of current speed, acceleration/deceleration, events, stops). The networked computer system 100 stores the information in the database(s) 106 and associates the information with the service record. In some embodiments, the networked computer system 100 periodically calculates the provider's ETA at the pick-up location and provides the provider's ETA to the requester application 114.

The networked computer system 100 determines the geospatial and topological location of the requester client device 112 in response to the requester 110 making a service request through the requester application 114. In one embodiment, the requester application 114 periodically transmits geospatial location information of the requester client device 112 to the networked computer system 100. The geospatial location information correspond to a current location data point of the requester client device 112 at an instance in time. Such a location data point can be generated by a location determination module (not shown) in the requester client device 112, such as, for example, a GPS component, a wireless networking system, or a combination thereof.

In some embodiments, the requester application 114 and the provider application 124 are configured to display map data indicating a specific geographical location of a place/point of interest (POI), as well as navigation instructions for the requester 110 using the requester application 114 on how to navigate (e.g., walk) to the specific geographical location of the place and navigation instructions for the provider 120 using the provider application 124 on how to navigate (e.g., drive) to the specific geographical location of the place. For example, the provider application 124 displays, on the client device 122 of the provider 120, a map that includes a graphic element that corresponds to the current location of the provider 120 or the client device 122 of the provider 120 and a graphic element that corresponds to the specific geographical location of a place associated with a service request, such as a place to pick up or drop off the requester 110 associated with the service request, as well as a route (generated by the computing nodes 104) from the current location of the provider 120 or the client device 122 of the provider 120 to the specific geographical location of the place associated with the service request. Similarly, the requester application 114 displays, on the client device 112 of the requester 110, a map that includes a graphic element that corresponds to the current location of the requester 110 or the client device 112 of the requester 110 and a graphic element that corresponds to the specific geographical location of the place associated with the service request, as well as a route (generated by the computing nodes 104) from the current location of the requester 110 or the client device 112 of the requester 110 to the specific geographical location of the place associated with the service request.

The map data and the navigation instructions are generated based on the specific geographical location of the place associated with the service request. In some embodiments, the corresponding map data and navigation instructions are generated by the requester application 114 and the provider application 124 using the geographical location of the place, which is received by the requester application 114 and the provider application 124 from the networked computer system 100. For example, the networked computer system 100 may store the geographical location of the place in association with an identifier of the place (e.g., a name of the place, an address of the place) in the database(s) 106, and then transmit the geographical location of the place to the requester application 114 and the provider application 124 for use in generating the corresponding map data and navigation instructions that are to be generated and displayed by the requester application 114 and the provider application 124. In other embodiments, the corresponding map data and navigation instructions are generated by the networked computer system 100 using the geographical location of the place stored in the database(s) 106 of the networked computer system 100 in association with an identifier of the place (e.g., a name of the place, an address of the place), and then transmitted to the requester application 114 and the provider application 124 for display on the client device 112 of the requester 110 and the client device 122 of the provider 120.

In some embodiments, the geographical location of a place comprises a geocode. A geocode comprises a spatial representation in numerical coordinates, such as latitude and longitude, of a physical location (e.g., a physical address). Other types of representations of a physical location may additionally or alternatively be used as the geographical location in providing the features disclosed herein.

In some embodiments, the service data comprises at least one of pick-up data and drop-off data. The pick-up data indicates a geographical location at which the provider 120 started transporting the requester 110 in servicing a request associated with the place. For example, the pick-up data for a place may comprise geocodes of geographical locations at which different providers started transporting different requesters in servicing requests associated with the place. The drop-off data indicates a geographical location at which the provider 120 completed transporting the requester 110 in servicing the request associated with the place. For example, the drop-off data for a place may comprise geocodes of geographical locations at which different providers completed transporting different requesters in servicing requests associated with the place. The pick-up data and drop-off data may comprise all of the pick-up data and drop-off data that are associated with requests that correspond to a particular time period. For example, the pick-up data and drop-off data may be limited to the pick-up data and drop-off data associated with requests that have been received and for which service has been completed within the last N months, where N is an integer, thereby ensuring that only recent relevant pick-up data and drop-off data is being used.

In some embodiments, satellite image data of a place and the service data of the place are stored in the database(s) 106 in association with an identification of the place. The indications of the corresponding service data of a place may be superimposed on the corresponding satellite image data of the place, thereby generating integrated data comprising both the satellite image data and the service data to be used in the training of the deep learning model(s). Additionally or alternatively, the corresponding satellite image data may be passed to the deep learning model(s) separately from the corresponding service data.

For some embodiments, the request routing module 102 receives a particular geographic routing request and directs the particular geographic routing request to a particular one of the computing nodes 104 (e.g., the computing nodes 104-1) to be serviced. The networked computer system 100, for example, receives a particular geographic routing request from the requester application 114 or provider application 124 in connection with a service requested by the requester 110, or the particular geographic routing request may be generated at the networked computer system 100 based on a service request received at the networked computer system 100 from the application requester application 114.

The request routing module 102 directs a particular geographic routing request to one or more individual computing nodes 104 based on the relevancy between the requested geographic route and the portions of map data (e.g., map data shards) assigned to those one or more individual computing nodes 104. For example, based on an origin location (or a destination location) associated with a particular geographic routing request received by the request routing module 102, the request routing module 102 directs the particular geographic routing request to one of the computing nodes 104 having an assigned portion of map data (e.g., assigned map data shard) in which the original location (or the destination location) falls. In order to appropriately direct geographic routing requests to individual computing nodes 104, the request routing module 102 maintains data (e.g., records or table) regarding assignment of map data portions to individual computing nodes 104. Individual ones of the computing nodes 104 may (periodically) report their assigned portion of map data to the request routing module 102. As a result, the request routing module 102 can deterministically map and direct a particular geographic routing request to a particular one of the computing nodes 104.

Turning now to the computing node 104-1, the assigned map data module 140-1 is configured to load a portion of map data, such as a map data shard, assigned to the computing node 104-1. Once loaded (e.g., into the memory of the computing node 104-1), the computing node 104-1 uses the assigned portion of map data to service (e.g., respond to) geographic routing requests that are directed to the computing node 104-1 by the request routing module 102. For instance, where the computing node 104-1 has a memory (e.g., dynamic random access memory (DRAM)) capacity of 128 GB, the portion of map data assigned to the computing node 104-1 may be loaded into 64 GB of the memory, while the remaining 64 GB may be reserved for caching map data as described herein. The assigned portion of map data may be loaded from a storage device (e.g., solid state drive) local to the computing node 104-1 or, alternatively, from an external data storage resource (e.g., the one or more database(s) 106). According to various embodiments, each of the computing nodes 104 is assigned a different portion of map data (e.g., different map data shard), and a portion of map data assigned to one of the computing nodes 104 may or may not partially overlap with another portion of map data assigned to another one of the computing nodes 104.

According to various embodiments, the map data caching module 142-1 facilitates caching of map data at the computing node 104-1. Depending on the embodiment, the cache comprises a dedicated memory device or, alternatively, comprises a reserved portion of the computing node 104-1's memory that is shared by at least one other component of the computing node 104-1 (e.g., reserved portion of DRAM serving as the primary memory for the computing node 104-1). According to various embodiments, the map data caching module 142-1 caches additional map data not part of the assigned portion of map data loaded by the assigned map data module 140-1. The additional map data may be cached based on map data requests received by the map data caching module 142-1. For example, upon determining that map data needed to service a particular geographic routing request is not available in the assigned portion of map data (e.g., needed map data falls outside the boundary of the map data shard boundary), the geographic routing service module 144-1 requests additional map data from the map data caching module 142-1. If there is a cache hit, then the map data caching module 142-1 provides the geographic routing service module 144-1 with the requested additional map data. If there is a cache miss (e.g., for some or all) of the requested additional map data, then the map data caching module 142-1 obtains the additional map data (e.g., from the database(s) 106) on behalf of the geographic routing service module 144-1, provides the requested additional map data, and stores the additional map data in the cache to service future cache requests. In this way, the map data caching module 142-1 operates the map data cache at the computing node 104-1 as a read-through cache.

In some embodiments, map data in the cache is removed (e.g., evicted) in accordance with a known data caching strategy. Alternatively, map data is maintained according to geographic routing patterns for a period of time. For example, a geographic routing pattern indicates that several geographic routes are being generated to a venue for a particular event (e.g., a week-long auto show or convention) held during a certain period of the year and, as such, map data in the cache relating to routes to and from the venue may be maintained in the cache during at least the certain period of the year. As another example, a geographic routing pattern indicates that several geographic routes to an airport are generated during the morning, and several geographic routes from the airport are generated during the evening. Accordingly, map data in the cache relating to routes to the airport are maintained in the cache during a morning time period, and map data in the cache relating to routes from the airport are maintained in the cache during an evening time period.

In some embodiments, additional map data is stored (e.g., pre-loaded at the computing node 104-1 startup/initialization) into the cache based on the assigned portion of map data (e.g., assigned map data shard). For example, certain map data are loaded into the cache based on a predetermined association between the certain map data with a certain assigned portion of map data (e.g., certain assigned map data shard). In another instance, map data that is not part of the assigned portion of map data (e.g., assigned map data shard), and that falls within the boundary of a certain geometric shape (e.g., ellipse, circle, square, triangle, etc.) positioned relative to the assigned portion of map data, is stored (e.g., preloaded) into the cache as additional map data.

Once a particular geographic routing request is directed to the computing node 104-1 (e.g., by the request routing module 102), the geographic routing service module 144-1 analyzes the particular geographic routing request and determines whether the particular geographic routing request involves map data not included by the assigned portion of map data loaded by the assigned map data module 140-1. If the particular geographic routing request involves map data not included by the assigned portion of map data (e.g., the destination location associated with the particular geographic routing request falls outside the boundary of the assigned map data shard), then the geographic routing service module 144-1 requests additional map data from the map data caching module 142-1 to appropriately service the particular geographic routing request. As noted herein, the additional map data may already be stored in the cache at the computing node 104-1 (i.e., cache hit) or may not be stored in the cache (i.e., cache miss) and need to be obtained by the map data caching module 142-1 on behalf of the geographic routing service module 144-1. Ultimately, based on the particular geographic routing request, the geographic routing service module 144-1 generates a route between two locations using the assigned portion of map data, the additional map data provided by the map data caching module 142-1, or a combination of both. The resulting route is then provided as a response to the geographic routing request.

Figure 2:
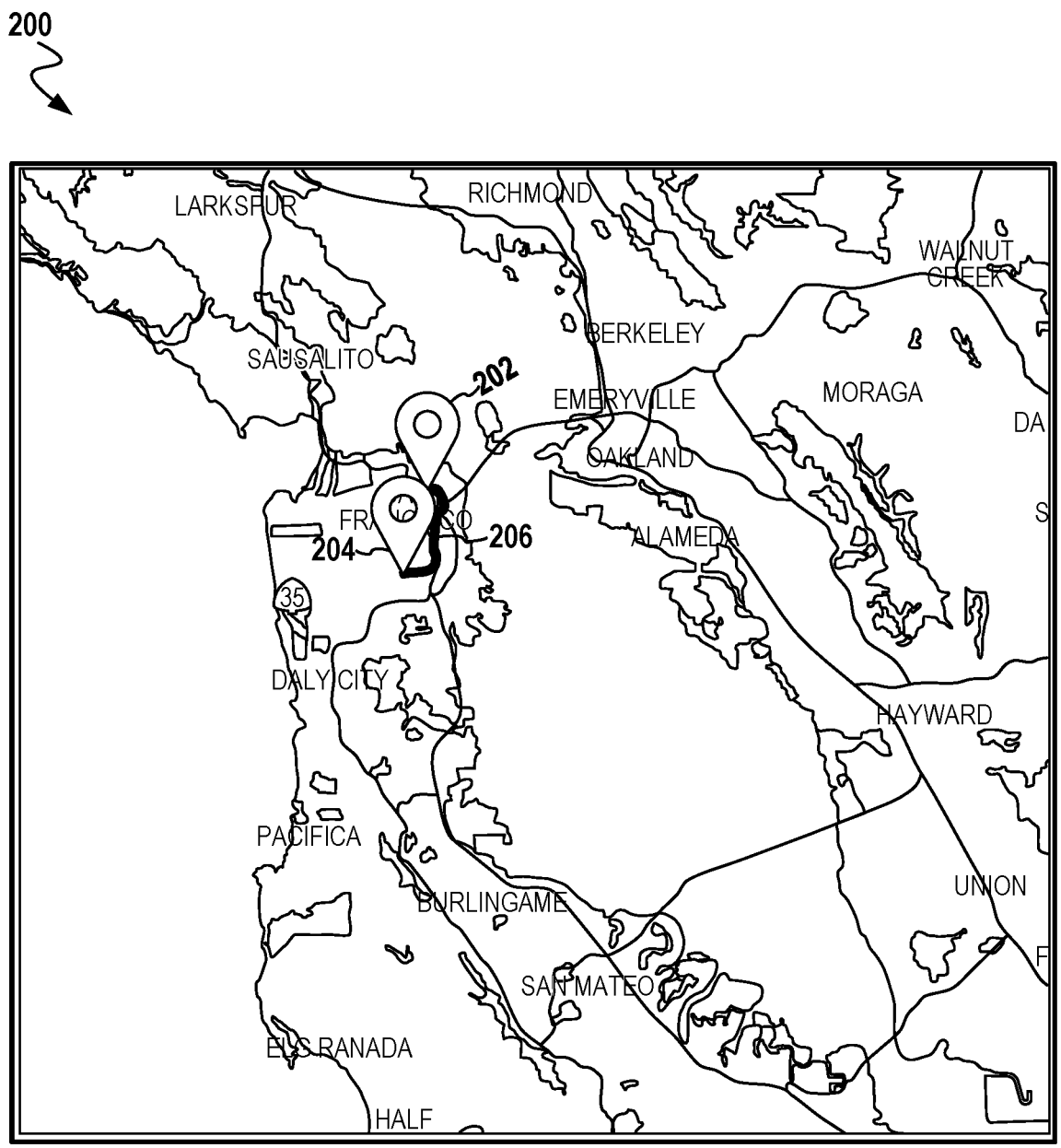
FIGS. 2 and 3 present example maps illustrating example geographic routes generated, in accordance with some embodiments.

FIG. 2 presents an example map 200 illustrating an example generated geographic route 206, in accordance with some embodiments. For illustrative purposes, location 204 represents an origin location of the geographic route 206, while location 202 represents a destination location of the geographic route 206.

Figure 3:
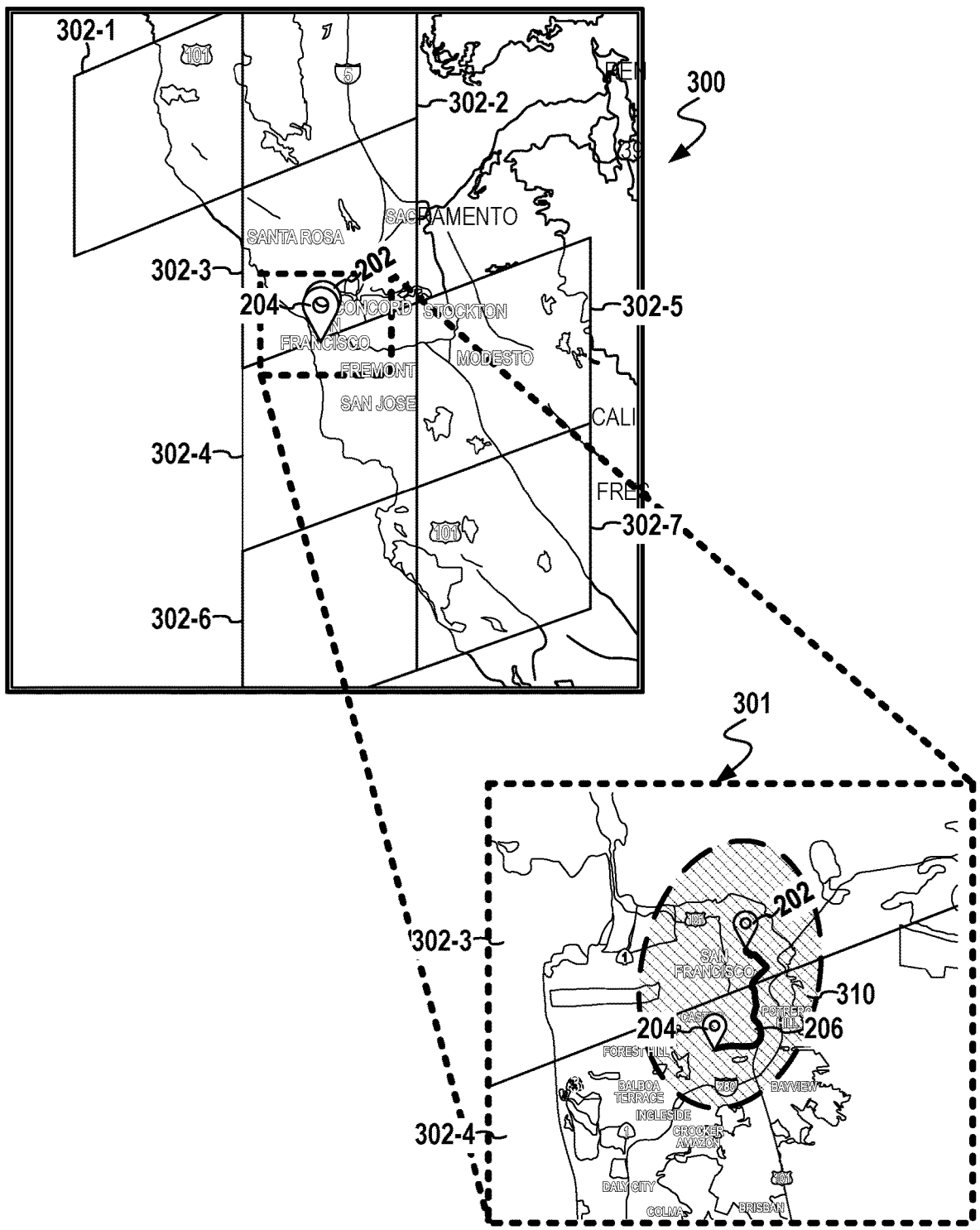

FIG. 3 presents an example map 300 illustrating the map 200 (of FIG. 2) with boundaries of portions 302-1, 302-2, 302-3, 302-4, 302-5, 302-6, and 302-7 of map data (e.g., boundaries of map data shards), in accordance with some embodiments. Sub-map 301 provides a magnified view of the portion of the map 300 that includes the geographic route 206, the origin location 204, and the destination location 202. As shown, the geographic route 206 is covered by two portions of map data (e.g., map data shards): 302-3 and 302-4.

According to some embodiments, the map data portion 302-3 is assigned one computing node (e.g., the computing node 104-1) and the map data portion 302-4 is assigned to another computing node. As such, for some embodiments, a given geographic routing request having the origin location 204 and the destination location 202 is originally directed (for servicing) to a computing node assigned to the map data portion 302-4 based on the fact that the origin location 204 falls within the map data portion 302-4. In turn, to service the given geographic routing request, the computing node assigned to the map data portion 302-4 caches map data not included by the map data portion 302-4. As shown in FIG. 3, the additional map data cached at the computing node would include at least some data from the map data portion 302-3. According to some embodiments, the additional map data cached at the computing node includes map data from the map data portion 302-3 that falls within the boundary of a geographic shape that is positioned relative to the map data portion 302-4. For instance, as illustrated in FIG. 3, the geometric shape includes an ellipse 310 positioned relative to the origin location 204 and the destination location 202. It will be appreciated that other geometric shapes, positioning, or factors may be used to determine what additional map data from the map data portion 302-3 is cached at the computing node in order to service the given geographic routing request.

Figure 4:
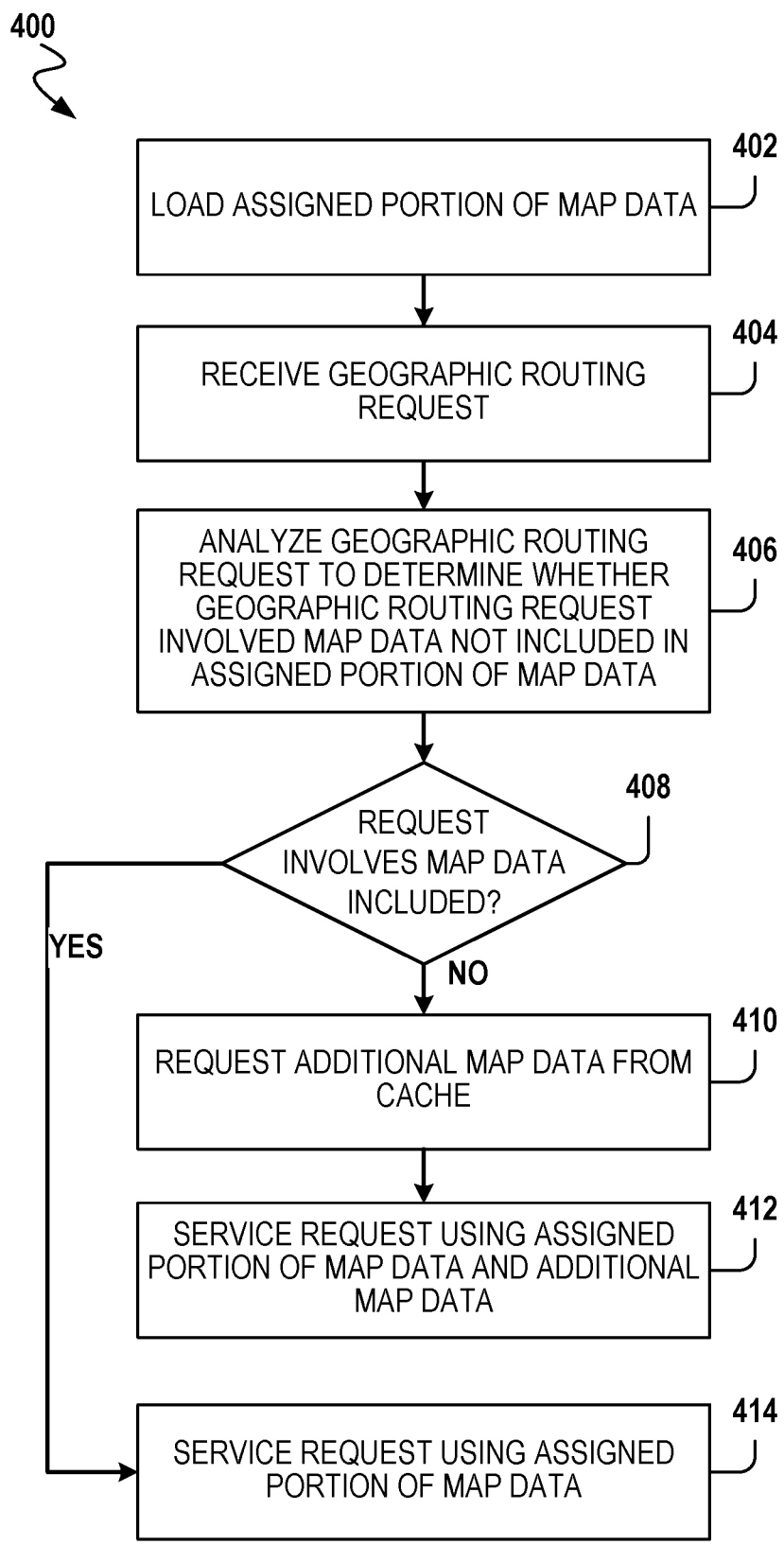
FIGS. 4 and 5 are flowcharts illustrating example methods for servicing geographic routing requests, in accordance with some embodiments.
Figure 5:
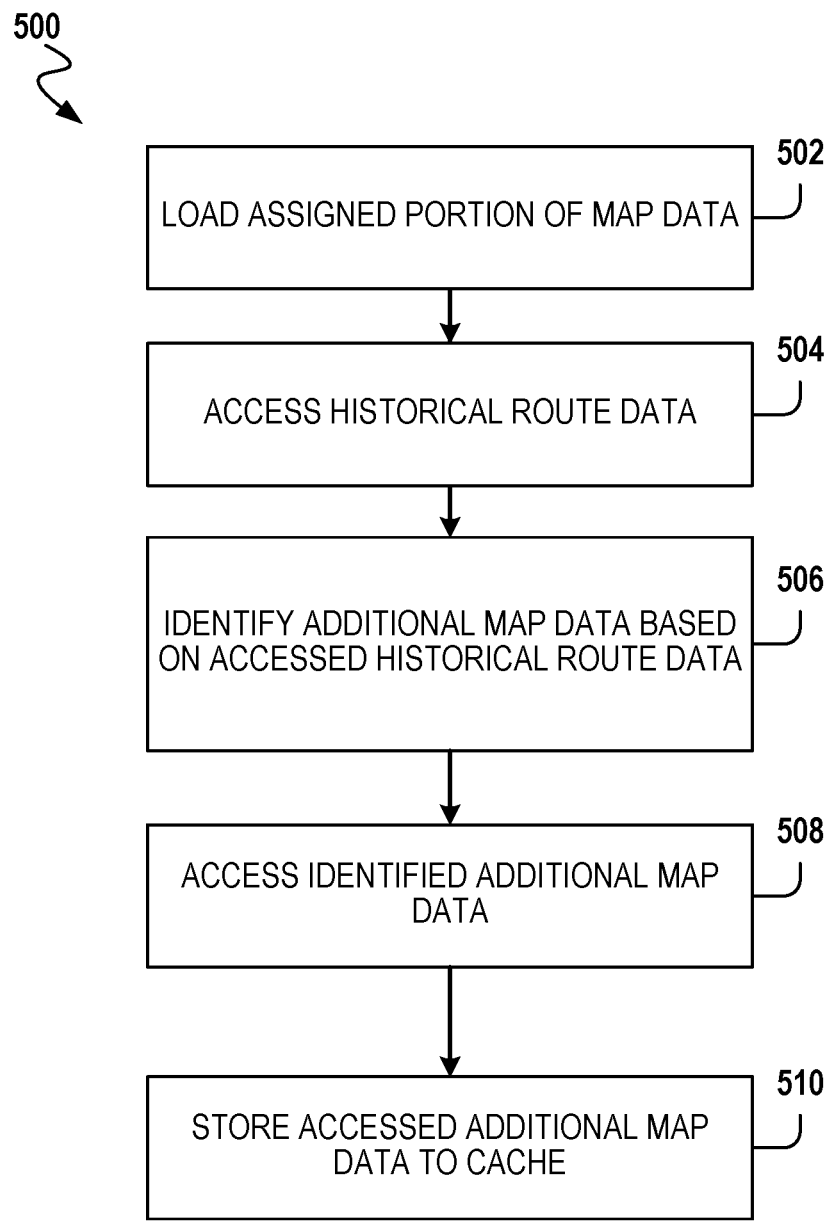

FIGS. 4 and 5 are flowcharts illustrating example methods for determining relevance of a place record, according to some embodiments. It will be understood that example methods described herein are performed by a computing device, such as a server executing instructions of a delivery or transportation service system. Additionally, example methods described herein may be implemented in the form of executable instructions stored on a computer-readable medium or in the form of electronic circuitry. For instance, the operations of a method 400 of FIG. 4 may be represented by executable instructions that, when executed by a processor of a computing node, cause the computing node to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 4, the flowchart illustrates the example method 400 for servicing a geographic routing request, in accordance with some embodiments. For some embodiments, the method 400 is performed by one of the computing nodes 104 described above with respect to FIG. 1. An operation of the method 400 may be performed by one or more hardware processors (e.g., central processing unit or graphics processing unit) of a computing node in a plurality of computing nodes.

The method 400 as illustrated begins with operation 402 (e.g., the assigned map data module 140-1) loading an assigned portion of map data (e.g., map data shard) for use (e.g., by the computing node 104-1) in servicing a received geographic routing request. According to some embodiments, loading the assigned portion of map data comprises loading the assigned portion of map data into memory space (e.g., on memory device of the computing node 104-1) reserved for the assigned portion of map data. Memory space of a memory device may be divided to reserve space for the assigned portion of map data and to reserve space for cached map data.

The method 400 continues with operation 404 (e.g., the geographic routing service module 144-1) receiving a particular geographic routing request. The geographic routing request may be received by a routing component (e.g., the request routing module 102) and then directed to one of the computing nodes (e.g., the computing node 104-1) based on relevance of the assigned portion of map data (e.g., of the computing node 104-1) to the received geographic routing request.

The method 400 continues with operation 406 (e.g., the geographic routing service module 144-1) analyzing the particular geographic routing request, received at operation 404, to determine whether the particular geographic routing request involves map data not included in the assigned portion of map data.

At decision point 408, if it is determined at operation 406 that the geographic routing request involves map data included in the assigned portion of map data, the method 400 continues to operation 414. At decision point 408, if it is determined at operation 406 that the geographic routing request does not involve map data included in the assigned portion of map data, the method 400 continues to operation 410.

From decision point 408, the method 400 can continue with operation 410 requesting (e.g., by the geographic routing service module 144-1) additional map data from a cache (e.g., the map data caching module 142-1) for the particular geographic routing request, where the additional map data is different from the assigned portion of map data (e.g., assigned to the computing node 104-1). Depending on the embodiment, the additional map data comprises a second portion of map data that includes an origin location or a destination location associated with the particular geographic route request. Further, the additional map data may comprise a minimum number of other portions of map data (e.g., other map data shards) that surround the second portion of map data.

The requested additional map data is eventually provided (e.g., to the geographic routing service module 144-1). If it is determined (e.g., by the map data caching module 142-1) that the requesting the additional map data from the cache results in a cache miss, the additional map data is obtained (e.g., by the map data caching module 142-1) from a data source (e.g., the database(s) 106) external from the computing node (e.g., the computing node 104-1). The obtained additional map data can then be stored in the cache for subsequent cache requests.

From operation 410, the method 400 continues with operation 412 servicing the geographic routing request (received by operation 402) using the assigned portion of map data (e.g., assigned to the computing node 104-1) and the additional map data (e.g., cached and provided by the map data caching module 142-1). Servicing the geographic routing request at operation 412 can comprise generating, based on the particular geographic request, a geographic route using the assigned portion of map data and the additional map data, and then responding to the particular geographic request with the generated geographic route.

From decision point 408, the method 400 can continue with operation 414 servicing the geographic routing request (received by operation 402) using just the assigned portion of map data (e.g., assigned to the computing node 104-1). Servicing the geographic routing request at operation 414 can comprise generating, based on the particular geographic request, a geographic route using the assigned portion of map data, and then responding to the particular geographic request with the generated geographic route.

Referring now to FIG. 5, the flowchart illustrates the example method 500 for servicing a geographic routing request, in accordance with some embodiments. Like the method 400, the method 500 is performed by one of the computing nodes 104 described above with respect to FIG. 1. An operation of the method 500 is performed by one or more hardware processors (e.g., central processing unit or graphics processing unit) of a computing node in a plurality of computing nodes.

The method 500 as illustrated begins with operation 502 (e.g., the assigned map data module 140-1) loading an assigned portion of map data (e.g., map data shard) for use (e.g., by the computing node 104-1) in servicing a received geographic routing request. According to some embodiments, loading the assigned portion of map data comprises loading the assigned portion of map data into memory space (e.g., on memory device of the computing node 104-1) reserved for the assigned portion of map data. As noted herein, memory space of a memory device may be divided to reserve space for the assigned portion of map data and to reserve space for cached map data.

The method 500 continues with operation 504 (e.g., the map data caching module 142-1) accessing historical geographic route data describing one or more geographic routes generated in the past.

The method 500 continues with operation 506 (e.g., the map data caching module 142-1) identifying additional map data based on the accessed historical geographic route data, the additional map data being different from the assigned portion of map data. The operation may include, for example, determining, based on the accessed historical geographic route data, a set of destination locations visited (e.g., commonly or frequently visited) from a set of origin locations covered by the assigned portion of map data. In such an instance, the additional map data covers a set of routes from the one or more origin locations to the set of destination locations.

The method 500 continues with operation 508 (e.g., the map data caching module 142-1) accessing the additional map data, identified at operation 506, from a data source (e.g., the database(s) 106) external to the computing node (e.g., the computing node 104-1).

The method 500 ends with operation 510 (e.g., the map data caching module 142-1) storing the additional map data to a cache at the computing node (e.g., the computing node 104-1).

Figure 6:
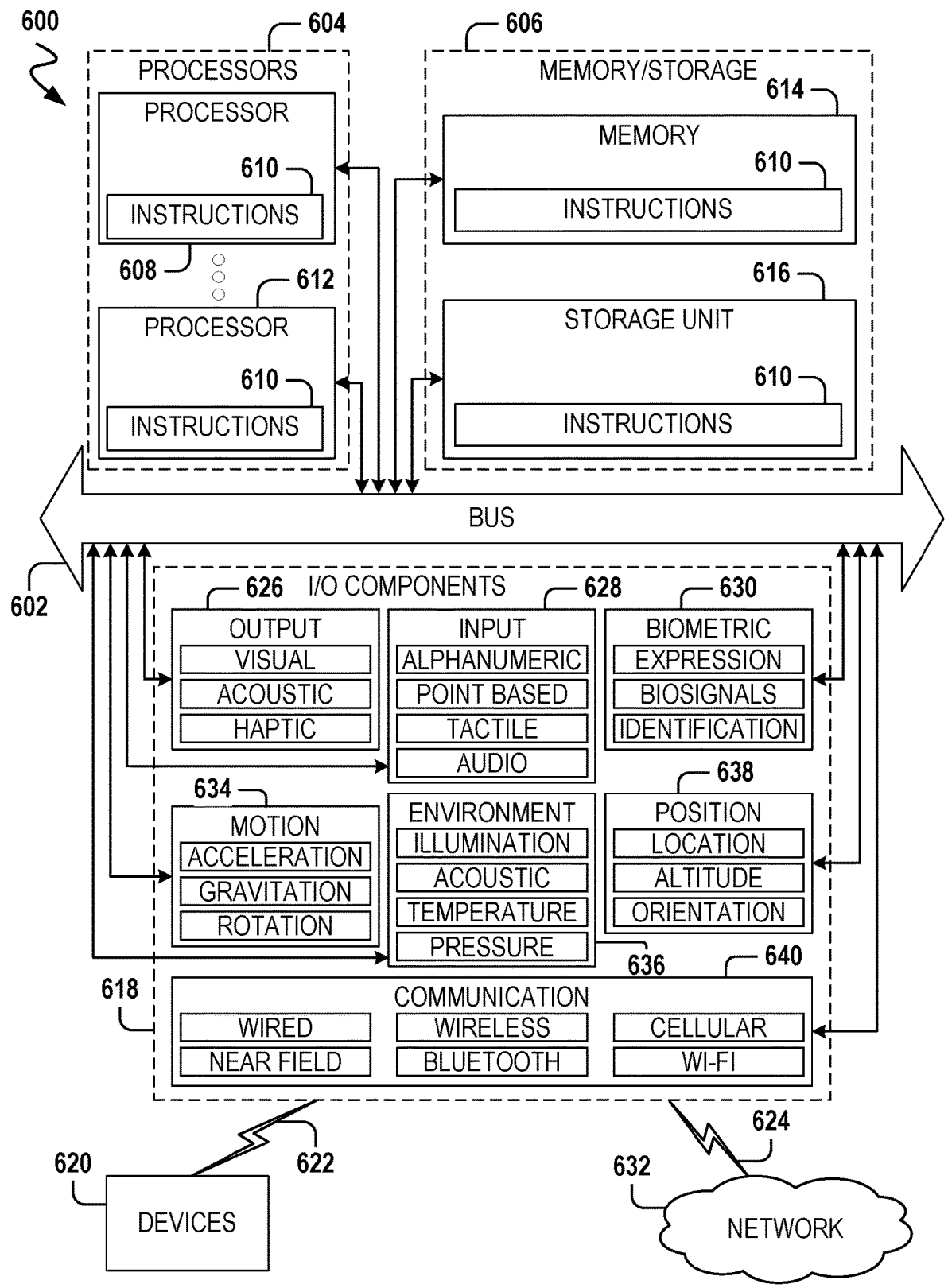
FIG. 6 is a block diagram illustrating components of an example machine used to implement some embodiments.

FIG. 6 is a block diagram illustrating components of the machine 600, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. For example, the instructions 610 may cause the machine 600 to execute the flow diagrams of other figures. Additionally, or alternatively, the instructions 610 may implement the servers associated with the services and components of other figures, and so forth. The instructions 610 transform the general, non-programmed machine 600 into a particular machine 600 programmed to carry out the described and illustrated functions in the manner described.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines 600 that individually or jointly execute the instructions 610 to perform any one or more of the methodologies discussed herein.

The machine 600 may include processors 604, memory/storage 606, and input/output (I/O) components 618, which may be configured to communicate with each other such as via a bus 602. In an embodiment, the processors 604 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 608 and a processor 612 that may execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of the processors 604 are examples of machine-readable media.

As used herein, "machine-readable medium" can mean a device able to store instructions and data temporarily or permanently and may include, but is not limited to, random-access memory (RAM), read-only memory (ROM), buffer memory, flash memory, optical media, magnetic media, cache memory, other types of storage (e.g., Electrically Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 610. The term "machine-readable medium" shall also be taken to include any medium, or combination of multiple media, that is capable of storing instructions (e.g., instructions 610) for execution by a machine (e.g., machine 600), such that the instructions, when executed by one or more processors of the machine (e.g., processors 604), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 618 may include a wide variety of components to receive input, provide output, produce output, transmit information, exchange information, capture measurements, and so on. The specific I/O components 618 that are included in a particular machine will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion, and the grouping is in no way limiting. In various embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location or force of touches or touch gestures, or other tactile input components), audio input components (e.g., a microphone), and the like.

In further embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via a coupling 624 and a coupling 622, respectively. For example, the communication components 640 may include a network interface component or other suitable device to interface with the network 632. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a Universal Serial Bus (USB)).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geo-location, location via Wi-Fi® signal triangulation, location via detecting an NFC beacon signal that may indicate a particular location, and so forth.

In various embodiments, one or more portions of the network 632 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 632 or a portion of the network 632 may include a wireless or cellular network, and the coupling 624 may be a Code Division Multiple Access (CDMA) connection, a Global System for Mobile communications (GSM) connection, or another type of cellular or wireless coupling. In this example, the coupling 624 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 610 may be transmitted or received over the network 632 using a transmission medium via a network interface device (e.g., a network interface component included in the communication components 640) and utilizing any one of a number of well-known transfer protocols (e.g., hypertext transfer protocol (HTTP)). Similarly, the instructions 610 may be transmitted or received using a transmission medium via the coupling 622 (e.g., a peer-to-peer coupling) to the devices 620. The term "transmission medium" shall be taken to include any intangible medium that is capable of storing, encoding, or carrying the instructions 610 for execution by the machine 600, and includes digital or analog communications signals or other intangible media to facilitate communication of such software.

Executable Instructions and Machine-Storage Medium

The various memories (i.e., 606, and/or memory of the processor(s) 604) and/or storage unit 616 may store one or more sets of instructions and data structures (e.g., software) embodying or utilized by any one or more of the methodologies or functions described herein. These instructions, when executed by processor(s) 604 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some embodiments provide a method comprising: loading an assigned portion of map data for use, by a computing node, in servicing a received geographic routing request; receiving a particular geographic routing request; analyzing the particular geographic routing request to determine whether the particular geographic routing request involves map data not included by the assigned portion of map data; and in response to determining that the particular geographic routing request involves map data not included by the assigned portion of map data, requesting, from the cache, additional map data for the particular geographic routing request, the additional map data being different from the assigned portion of map data. The assigned portion may comprise a map data shard. The particular geographic routing request is directed to the at least one computing node based on the assigned portion of map data. The additional map data comprises a second portion of map data (e.g., another map data shard) that includes an origin location or a destination location associated with the particular geographic route request. The additional map data further comprises a minimum number of other portions of map data that surround the second portion of map data (e.g., certain portion of map data surrounding the origin location or the destination location).

The method may further comprise: determining whether the requesting the additional map data from the cache results in a cache miss; and in response to determining that the requesting the additional map data from the cache results in a cache miss, obtaining the additional map data from a data source external from the at least one computing node. The method may further comprise: generating, based on the particular geographic request, a geographic route using the assigned portion of map data and the additional map data; and responding to the particular geographic request with the generated geographic route.

Some embodiments provide a method comprising: loading, at a computing node, an assigned portion of map data for use, by the computing node, in servicing a received geographic routing request; accessing, at the computing node, historical geographic route data describing one or more geographic routes generated in the past; identifying, at the computing node, additional map data based on the accessed historical geographic route data, the additional map data being different from the assigned portion of map data; and accessing, at the computing node, the additional map data from a data source external to the computing node. The method may further comprise storing the additional map data to a cache at the computing node. The identifying the additional map data based on the accessed historical geographic route data may comprise: determining, based on the accessed historical geographic route data, a set of destination locations visited (e.g., commonly or frequently visited) from a set of origin locations covered by the assigned portion of map data, where the additional map data at least covers a set of routes from the one or more origin locations to the set of destination locations.

The method may further comprise: receiving, at the computing node, a particular geographic routing request between a particular origin location covered by the assigned portion of map data and a particular destination location; analyzing the particular geographic routing request to determine whether the particular geographic routing request involves map data not included by the assigned portion of map data; and in response to determining that the particular geographic routing request involves map data not included by the assigned portion of map data, requesting, from the cache, particular map data that covers at least one route from the particular origin location to the particular destination location, the particular map data being different from the assigned portion of map data. The method may further comprise: in response to the requesting the particular map data from the cache: determining whether the particular map data is stored in the cache; and in response to the determining that the particular map data is stored in the cache, receiving the particular map data from the additional map data stored on the cache. The method may further comprise: determining whether the requesting the particular map data from the cache results in a cache miss; and in response to determining that the requesting the particular map data from the cache results in a cache miss, accessing the particular map data from a data source external from the computing node.

For various embodiments, the computing node performing a method described herein is part of a plurality of computing nodes for servicing geographic routing requests between origin locations and destination locations, and each computing node in the plurality of computing nodes is assigned a portion of map data for servicing a geographic routing request.

Some embodiments provide a method comprising: loading an assigned portion of map data for use, by the computing node, in servicing a received geographic routing request; accessing, from a data source external to the computing node, additional map data based on the assigned portion of the map data; and storing the additional map data to a cache at the computing node. The accessing the additional map data based on the assigned portion of the map data comprises identifying map data falling within a boundary of a geometric shape positioned relative to the assigned portion of map data, such that the additional map data comprises the identified map data. Additionally, the accessing the additional map data based on the assigned portion of the map data comprises accessing a set of portions of map data associated with the assigned portion of data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

One or more embodiments described herein can be implemented using modules, engines, or components, which may be programmatic in nature. As used herein, a module, engine, or component can comprise a unit of functionality that can be performed in accordance with one or more embodiments described herein. A module, engine, or component might be implemented utilizing any form of hardware, software, or a combination thereof. Accordingly, a module, engine, or component can include a program, a sub-routine, a portion of a software application, or a software component or a hardware component capable of performing one or more stated tasks or functions. For instance, one or more hardware processors, controllers, circuits (e.g., ASICs, PLAs, PALs, CPLDs, FPGAs), logical components, software routines or other mechanisms might be implemented to make up a module, engine, or component. In implementation, the various modules/engines/components described herein might be implemented as discrete elements or the functions and features described can be shared in part, or in total, among one or more elements. Accordingly, various features and functionality described herein may be implemented in any software application and can be implemented in one or more separate or shared modules/engines/components in various combinations and permutations. Even though various features or elements of functionality may be individually described or claimed as separate modules, for some embodiments, these features and functionality can be shared among one or more common software and hardware elements. The description provided herein shall not require or imply that separate hardware or software components are used to implement such features or functionality.

As used herein, the term "or" may be construed in either an inclusive or exclusive sense. The terms "a" or "an" should be read as meaning "at least one", "one or more", or the like. The presence of broadening words and phrases such as "one or more", "at least", "but not limited to", or other like phrases in some instances shall not be read to mean that the narrower case is intended or required in instances where such broadening phrases may be absent. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a plurality of computing nodes for servicing geographic routing requests between origin locations and destination locations, each individual computing node in the plurality of computing nodes comprising a cache and being assigned a portion of map data for servicing geographic routing requests that are routed from a client device to the individual computing node; and
   a request routing module configured to receive an individual geographic routing request from a client device and route the individual geographic routing request to a select computing node in the plurality of computing nodes, and the select computing node being configured to perform operations comprising:
      loading an assigned portion of map data for use, by the select computing node, in servicing geographic routing requests received by the select computing node from the request routing module, the assigned portion of map data being assigned to the select computing node;
      receiving, from the request routing module, a particular geographic routing request between a particular origin location covered by the assigned portion of map data and a particular destination location, the particular geographic routing describing the particular origin location and the particular destination location;
      analyzing the particular geographic routing request to determine whether the particular geographic routing request involves map data not included by the assigned portion of map data;

in response to determining that the particular geographic routing request involves map data not included by the assigned portion of map data, requesting, from the cache of the select computing node, additional map data for the particular geographic routing request, the additional map data being different from the assigned portion of map data;

generating, based on the particular geographic routing request, a geographic route using the assigned portion of map data and the additional map data; and responding to the particular geographic request by providing the generated geographic route to the client device.

2. The system of claim 1, wherein the operations further comprise:

determining whether the requesting the additional map data from the cache results in a cache miss; and in response to determining that the requesting the additional map data from the cache results in the cache miss, accessing the additional map data from a data source external from the computing node.

3. The system of claim 1, wherein the assigned portion comprises a map data shard.

4. The system of claim 1, wherein the particular geographic routing request is directed to the computing node based on the assigned portion of map data.

5. The system of claim 1, wherein the additional map data comprises a second portion of map data that includes a given origin location or a given destination location associated with the particular geographic route request.

6. The system of claim 5, wherein the additional map data further comprises a minimum number of other portions of map data that surround the second portion of map data.

7. The system of claim 1, wherein the operations comprise:

accessing historical geographic route data describing one or more geographic routes generated in the past;

identifying the additional map data based on the accessed historical geographic route data, the additional map data being different from the assigned portion of map data; and storing the additional map data to the cache of the select computing node.

8. A method comprising:

loading, at a computing node, an assigned portion of map data for use, by the computing node, in servicing geographic routing requests received by the computing node from a request routing module, the assigned portion of map data being assigned to the computing node, and the request routing module configured to receive an individual geographic routing request from a client device and route the individual geographic routing request to the computing node;

accessing, at the computing node, historical geographic route data describing one or more geographic routes generated in the past;

identifying, at the computing node, additional map data based on the accessed historical geographic route data, the additional map data being different from the assigned portion of map data;

accessing, at the computing node, the additional map data from a data source external to the computing node;

receiving, from the request routing module, a particular geographic routing request between a particular origin location covered by the assigned portion of map data and a particular destination location, the particular geographic routing describing the particular origin location and the particular destination location;

generating, based on the particular geographic routing request, a geographic route using the assigned portion of map data and the additional map data; and responding to the particular geographic request by providing the generated geographic route to the client device.

9. The method of claim 8, wherein the identifying the additional map data based on the accessed historical geographic route data comprises:

determining, based on the accessed historical geographic route data, a set of destination locations visited from a set of origin locations covered by the assigned portion of map data, the additional map data at least covering a set of routes from the one or more origin locations to the set of destination locations.

10. The method of claim 8, wherein the assigned portion comprises a map data shard.

11. The method of claim 8, further comprising:

storing the additional map data to a cache of the computing node.

12. The method of claim 11, further comprising:

analyzing the particular geographic routing request to determine whether the particular geographic routing request involves map data not included by the assigned portion of map data; and in response to determining that the particular geographic routing request involves map data not included by the assigned portion of map data, requesting, from the cache, particular map data that covers at least one route from the particular origin location to the particular destination location, the particular map data being different from the assigned portion of map data.

13. The method of claim 12, wherein the particular destination location is included in a set of destination locations, the set of destination locations visited from a set of origin locations covered by the assigned portion of map data, and the method further comprises:

in response to the requesting the particular map data from the cache:

determining whether the particular map data is stored in the cache; and in response to the determining that the particular map data is stored in the cache, accessing the particular map data from the additional map data stored on the cache.

14. The method of claim 12, further comprising:

determining whether the requesting the particular map data from the cache results in a cache miss; and in response to determining that the requesting the particular map data from the cache results in the cache miss, accessing the particular map data from a data source external from the computing node.

15. The method of claim 8, wherein the computing node is part of a plurality of computing nodes for servicing geographic routing requests between origin locations and destination locations, each computing node in the plurality of computing nodes being assigned a portion of map data for servicing a geographic routing request.

16. A non-transitory computer storage medium comprising instructions that, when executed by one or more hardware processors of a computing node, cause the computing node to perform operations comprising:

loading an assigned portion of map data for use, by the computing node, in servicing geographic routing requests received by the computing node from a request routing module, the assigned portion of map data being assigned to the computing node, and the request routing module configured to receive an individual geographic routing request from a client device and route the individual geographic routing request to the computing node;

accessing, from a data source external to the computing node, additional map data based on the assigned portion of the map data;

storing the additional map data to a cache of the computing node;

receiving, from the request routing module, a particular geographic routing request between a particular origin location covered by the assigned portion of map data and a particular destination location, the particular geographic routing describing the particular origin location and the particular destination location;

generating, based on the particular geographic routing request, a geographic route using the assigned portion of map data and the additional map data; and responding to the particular geographic request by providing the generated geographic route to the client device.

17. The non-transitory computer storage medium of claim 16, wherein the accessing the additional map data based on the assigned portion of the map data comprises:

identifying map data falling within a boundary of a geometric shape positioned relative to the assigned portion of map data, the additional map data comprising the identified map data.

18. The non-transitory computer storage medium of claim 16, wherein the accessing the additional map data based on the assigned portion of the map data comprises accessing a set of portions of map data associated with the assigned portion of data.

19. The non-transitory computer storage medium of claim 16, wherein the assigned portion comprises a map data shard.

20. The non-transitory computer storage medium of claim 16, wherein the operations further comprise:

analyzing the particular geographic routing request to determine whether the particular geographic routing request involves map data not included by the assigned portion of map data; and in response to determining that the particular geographic routing request involves map data not included by the assigned portion of map data, requesting, from the cache, particular map data for the particular geographic routing request, the particular map data being different from the assigned portion of map data.

* * * * *